June 3, 1969  R. F. DAVIS, JR  3,447,565
HIGH PRESSURE RELIEF VALVE
Filed May 15, 1967
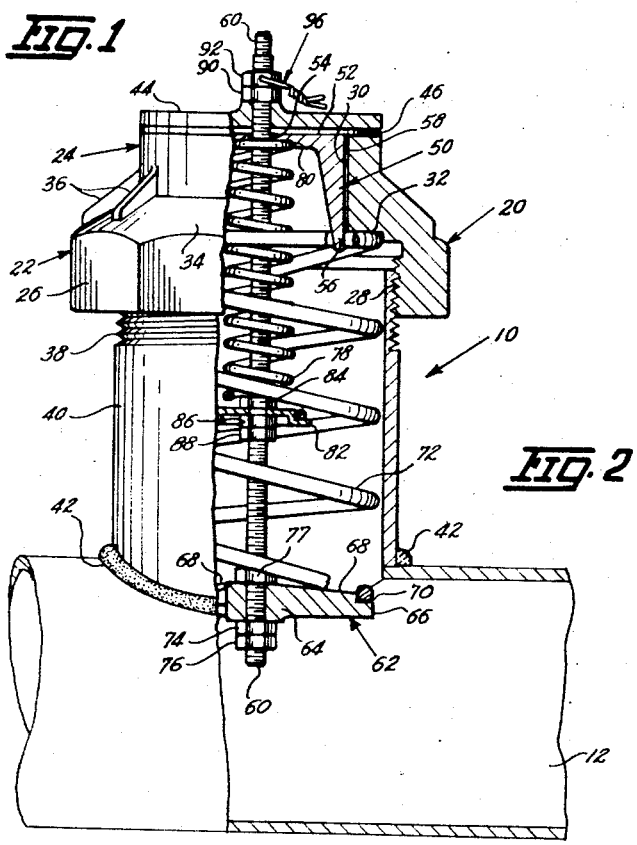
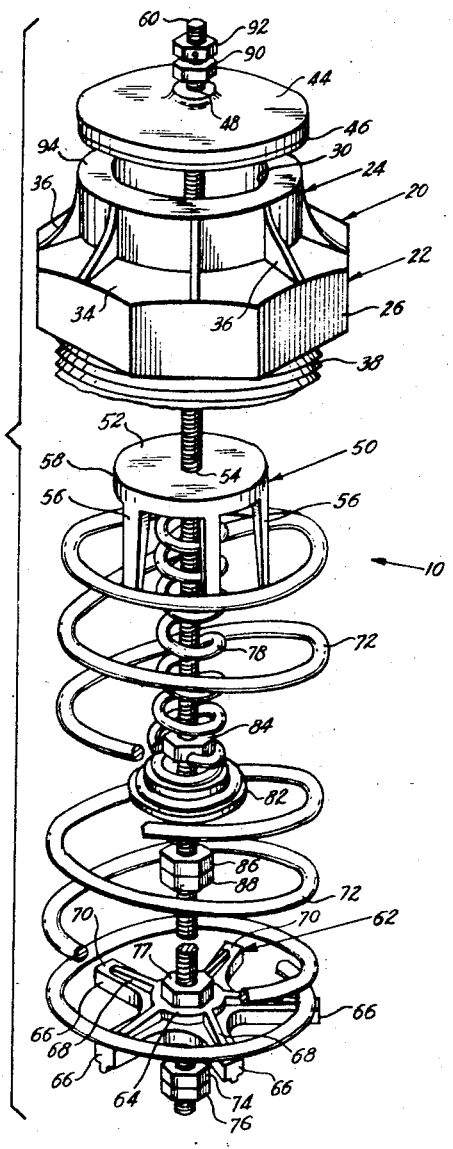
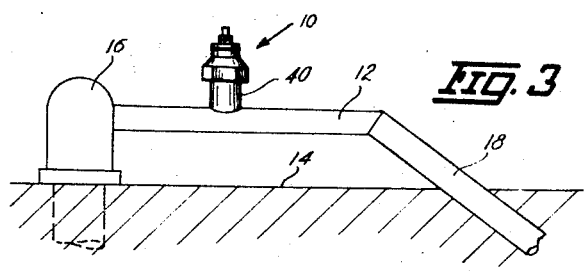
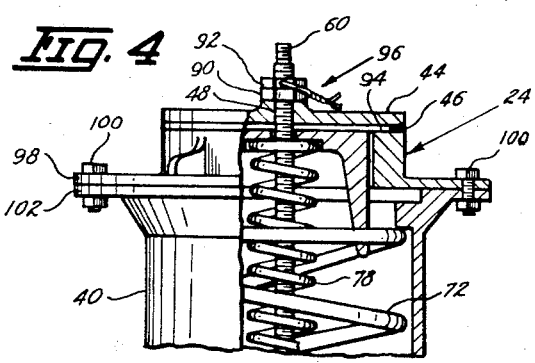
INVENTOR.
ROY FORREST DAVIS, JR.
BY Morton S. Adler
ATTORNEY.

United States Patent Office 3,447,565
Patented June 3, 1969

3,447,565
HIGH PRESSURE RELIEF VALVE
Roy Forrest Davis, Jr., Des Moines, Iowa, assignor to Western Irrigation Valve Corporation, Des Moines, Iowa, a corporation of Iowa
Filed May 15, 1967, Ser. No. 638,337
Int. Cl. F16k 17/06, 17/08
U.S. Cl. 137—541                    7 Claims

ABSTRACT OF THE DISCLOSURE

A high pressure relief valve to relieve pressure buildups and overload surges in fluid flow lines. Has a spring-loaded valve cap with an auxiliary spring-loaded stem that can be adjusted to selectively increase and decrease the tension on the cap spring to vary the pressure desired or necessary at which the cap will unseat. Pressure adjustments are easily made in the field by adjusting the stem to prescribed measurements. Is adapted for a threaded or flange mounting to a flow pipe.

BACKGROUND OF THE INVENTION

Field of the invention

This invention relates to a high pressure relief valve designed more particularly for use in irrigation pipe lines although it is not intended to be limited to such use.

In irrigation systems, there are at times unexpected buildups of pressure or overload surges from various causes which can result in considerable damage unless such pressure is relieved and the present invention is concerned with an effective and easily adjustable valve means to automatically accomplish this purpose.

Description of the prior art

An old and commonly used relief valve means for irrigation pipes is a relatively high standpipe which may include a shear pin attached valve cap that much be replaced if sufficient pressure develops to blow the cap off. Small orifice valves are sometimes used in place of the standpipe arrangement and also, as illustrated in Patent 2,973,908 there are valves in use in irrigation systems which control auxiliary flows and are responsive to given pressures for actuation.

The present invention includes a permanently mounted valve that can be quickly and easily adjusted for different pressures and which opens and closes automatically.

SUMMARY

The present invention is designed to provide an efficient and dependable relief valve particularly in the main water feed line as used in irrigation systems. In such systems, pressure buildups and overload surges may occur by carelessness on the part of service personnel in not opening lateral feed lines, for example, or from many other different reasons and unless such excess pressure is timely relief, considerable damage can result to the system.

The present valve is designed to be either threadably attached or flange mounted to a relatively short length of pipe that in turn is welded to the main feeder line. Such valve includes a spring-loaded cap, where the spring is completely enclosed in the valve housing and includes a spring-loaded stem having one end projecting through the top of the valve cap. The stem assembly is designed so that rotation thereof in different directions, which can be accomplished from the exterior of the valve, can selectively increase or decrease the tension on the valve spring and thereby predetermine the exact pressure at which the valve will open.

Pressure adjustment of this valve can be made as easily in the field as at the factory and means are provided to secure the adjustment at any given position so that any tampering therewith can be detected.

BRIEF DESCRIPTION OF THE DRAWINGS

FIG. 1 is an elevational view of this new pressure relief valve, shown partly in section to more fully illustrate the construction thereof, and showing its relationship to a fragmentary portion of an irrigation pipe, FIG. 2 is an enlarged perspective exploded view of the valve shown in FIG. 1, FIG. 3 is a schematic drawing illustrating portions of an irrigation system and showing the environmental relationship thereto of this invention, and FIG. 4 is a fragmentary elevational view of the upper portion of this valve, partly in section, to illustrate a flange-type mounting for this valve as distinguished from the threadable mounting in FIG. 1.

DESCRIPTION OF THE PREFERRED EMBODIMENTS

Referring to the drawings, this new relief valve is designated generally by the numeral 10 and is illustrated in its preferred environmental use in FIG. 3 where it is shown mounted to a water supply line 12 that is a part of an irrigation system. Line 12 is above ground level 14, will connect to a pump 16 and has extensions 18 for delivering water to underground areas in a well known manner. The purpose and function of valve 12 is to provide an efficient, dependable and automatically operable high pressure relief outlet for unusual pressure buildups and overload surges that may develop in line 12 and to accomplish this purpose, valve 12 is constructed as follows.

The valve body or housing 20 has an integral bottom portion 22 and a reduced top portion 24 with portion 22 having an octagonal external edge surface 26 and an internal threaded bore 28. Portion 24 is cylindrical in shape defining a bore 30 that is concentrically smaller than bore 28 so as to create the internal shoulder 32. The top surface 34 of the bottom 22 is one an incline upwardly to the bottom of the top portion 24 and struts or gussets 36 integrally connect portions 22 and 24 of the valve body 20 at approximately the center of each of the octagonal sections. Thus far described, valve body 20 is designed for threadable attachment to the threaded portion 38 of a short pipe length 40 that is welded 42 at its bottom to irrigation pipe 12 as best seen in FIG. 3.

The valve assembly for valve body 20 includes a disc-shaped cap 44 having an annular gasket 46 of rubber or the like bonded to the underside at preferably the edge portion thereof as seen in FIG. 1 and is provided with the axial opening 48. A guide yoke 50, for association with cap 44 as will appear, comprises a disc-like top 52 which is provided with the axial opening 54, and includes a plurality of concentrically spaced fingers 56 depending from and substantially planar with the edge portion 58 of yoke top 52. The diameter of yoke 50 approximates the diameter of bore 30 (FIGS. 1 and 2) so that such yoke can be received into said bore with the fingers 56 serving as guides and contact means relative to the wall of bore 30 and extending below shoulder 32. The top of yoke 50 is tightly abutted against the underside of cap 44 which is accomplished as follows.

An elongated threaded operating stem 60 extends through the hole 48 in cap 44 and through the hole 54 in yoke 50 so that the major length of such stem extends axially downwardly through pipe 40 and into pipe 12, and a relatively small length of stem projects upwardly from cap 44 as best seen in FIG. 1. Near the bottom of stem 60 there is mounted the operating spring retainer 62 which comprises an apertured hub 64 having a plurality of equally spaced radial arms 66 whereby there is a minimum of obstruction to the passage of water therethrough. A raised rib 68 is formed on the top of each arm 66 and terminates short of the end of such arms to provide a seat 70 for the lower end of the operating spring 72. Below the retainer 62 on stem 60 there is the retainer holding nut 74 and the locknut 76 and above the retainer, is a nut 77.

Spring 72 is concentrically disposed relative to stem 60 and the upper end of such spring is in abutting engagement with shoulder 32 in the valve body 20. A second spring, designated as the adjustment takeup spring 78, is considerably smaller in diameter than the operating spring 72, is shorter in length than spring 72 and is mounted on stem 60 as seen in FIGS. 1 and 2. The top of spring 78 is seated in a suitable axial recess 80 in the underside of the top portion 52 of yoke 50 and the lower end of such spring extends downwardly on stem 60 approximately half way more or less towards the retainer 62 where it engages the cupped washer 82. Nuts 84 and 86 are placed on stem 60 respectively above and below the washer 82 and a locknut 88 is used below nut 86. Likewise, on that part of stem 60 projecting above cap 44, there is the holding nut 90 and the locknut 92.

OPERATION

With valve 10 constructed and assembled as described, cap 44 will normally be seated in sealing contact with body 20 by the engagement of gasket 46 with the top surface 94 of valve body portion 24. Yoke 50 is held in tight engagement with cap 44 by spring 78 that is suitably held under tension by nuts 84, 86, 88, 90 and 92, and it will be understood that the tension on spring 78 reacts as to the tension on the larger spring 72 since any vertical movement of stem 60 to increase or decrease tension on spring 78 will have a corresponding effect on spring 72 by the relative movement of the retainer 62.

Valve 10 is designed so that it can be set for spring 72 to react to any given pressure in unseating cap 44 and normally, the factory setting is to permit the relief of pressure at 22 p.s.i. To change this setting, all that is required is to loosen and remove the locknut 92, rotate nut 90 so as to raise stem 60 to increase the pressure, or lower stem 60 to decrease the pressure and then replace nut 92. The exact pressure setting desired is determined by a precise measurement of the distance from the top surface of nut 90 to the top end of stem 60 and this is the reason for preferably removing the locknut 92 is making a pressure setting. The most commonly used pressure settings determined from a field survey were 22, 44, 60, 80, 100 and 125 p.s.i. and tables to accomplish these pressures have devised for valve 10. Such pressure settings, however, can be varied if required in special circumstances.

The measurements for pressure settings will vary for like pressures in different diameter pipes and the following tables are illustrative of the exact distance necessary from the top of nut 90 to the top of stem 60 for pipes of 6, 8 and 10 inch diameters.

| P.s.i. | For 6″ pipes (in.) | For 8″ pipes (in.) | For 10″ pipes (in.) |
|---|---|---|---|
| 22 | 5/16 | 9/16 | 3/4 |
| 44 | 11/16 | 15/16 | 1 11/16 |
| 60 | 15/16 | 1 3/4 | 2 1/4 |
| 80 | 1 1/4 | 2 5/16 | 2 15/16 |
| 100 | 1 5/8 | 2 7/8 | 3 1/16 |
| 125 | 2 | 3 3/8 | 4 5/8 |

From the foregoing, it will be appreciated that intermediate settings or settings for other pipe sizes can be readily determined when necessary.

The commonly used settings as set forth in the above tables are provided to field personnel so that adjustments of pressure settings can be easily made in the field by any lay worker since no mechanical proficiency is required.

It may be desirable at times to establish whether a preset adjustment has been tampered with and for this purpose it is recommended that once a proper pressure setting has been made, a hole be drilled through nut 90 and stem 60 to receive a suitable wire or other suitable means 96 that can be effectively sealed so its removal can be detected.

With reference to FIG. 4, there is shown a modified arrangement for mounting valve 10 to pipe 40 wherein the lower portion 22 of valve body 20 includes a flange member 98 that is secured by bolts and nuts 100 to a companion flange 102 which is suitably secured to pipe 40. In all other respects including construction and operation, the valve in FIG. 4 is the same as that shown and described relative to FIGS. 1 and 2.

From the foregoing, it is thus thought a full understanding of the construction and operation of this invention will be had and the advantages of the same will be appreciated.

It will be understood that the phraseology employed herein is for the purpose of description and not for limitation and that modification and changes in the construction and arrangement of this invention can be made without departing from the spirit and purpose thereof.

I claim:
1. A high pressure relief valve, comprising,
   a valve body having a top and bottom portion with said bottom portion adapted for attachment to a fluid flow line so as to communicate with the interior thereof,
   said valve body being provided with a through bore that is concentrically reduced in the top portion to define an internal shoulder intermediate said top and bottom portion,
   a cap on said top portion and designed for sealing engagement therewith to serve as a closure for one end of said bore,
   an operating stem having an upper end projecting upwardly through said cap and a lower end extending downwardly through said bore into the flow line,
   a yielding means operatively attached at one end to the lower end of said stem and in abutting engagement at the other end with said shoulder, and
   means to move said stem in two respective opposite directions longitudinally of said bore and said cap whereby pressure on said yielding means can be selectively increased and decreased to selectively determine the p.s.i. of pressure at which said cap will unseat against the pressure exerted by said yielding means.
2. A valve as defined in claim 1 including:
   a guide yoke for said stem slidably disposed in the top portion of said valve body, and
   means on said stem for urging said yoke in tight abutting engagement with said cap.
3. A valve as defined in claim 1 including:
   a second yielding means disposed on said stem with one end of said second yielding means being operatively attached to said stem intermediate the ends thereof and the other end being operatively attached to said cap.
4. A valve as defined in claim 1 wherein said yielding means is a coil spring concentrically arranged relative to said stem.
5. A valve as defined in claim 4 wherein:
   said second yielding means is a coil spring concentrically arranged relative to said stem and is disposed within the convolutions of said first mentioned spring.
6. A valve as defined in claim 1 wherein:
   said stem is externally threaded, a holding nut threadably engaged on the end of said stem projecting beyond said cap so as to be capable of being tightened against the exterior side of said cap, rotation of said nut in one direction acting to rise said stem and increase pressure on said yielding means, and rotation of said nut in an opposite direction acting to lower said stem and decrease pressure on said yielding means.

7. A valve as defined in claim 6 wherein the distance from the top of said nut to the upper end of said stem has a direct relationship to the p.s.i. pressure at which said cap will unseat so that precise pressure settings can be made by adjusting the length of said stem above said nut to predetermine measurements.

References Cited

UNITED STATES PATENTS

| | | | |
|---|---|---|---|
| 144,844 | 11/1873 | Gould | 137—541 |
| 2,016,278 | 10/1935 | Ehlers | 137—541 X |
| 2,072,271 | 3/1937 | Meadows | 37—541 |
| 2,614,582 | 10/1952 | St. Clair | 137—541 X |
| 2,639,726 | 5/1953 | Golob | 137—543.15 X |
| 3,035,604 | 5/1962 | Portis | 137—541 X |

ALAN COHAN, *Primary Examiner.*

DENNIS H. LAMBERT, *Assistant Examiner.*

U.S. Cl. X.R.

251—337